US008510853B2

(12) United States Patent
Song et al.

(10) Patent No.: US 8,510,853 B2
(45) Date of Patent: Aug. 13, 2013

(54) CONTENT MANAGEMENT METHOD AND APPARATUS OF MOBILE TERMINAL

(75) Inventors: Ji Hwan Song, Seongnam-si (KR); Ji Sun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 30 days.

(21) Appl. No.: 13/345,572

(22) Filed: Jan. 6, 2012

(65) Prior Publication Data

US 2012/0180136 A1      Jul. 12, 2012

(30) Foreign Application Priority Data

Jan. 10, 2011    (KR) ........................ 10-2011-0002310

(51) Int. Cl.
*G06F 21/00*      (2006.01)
(52) U.S. Cl.
USPC .............................................. 726/26; 705/51
(58) Field of Classification Search
USPC ............................................ 726/26; 705/51
See application file for complete search history.

(56) References Cited

U.S. PATENT DOCUMENTS

| 2002/0013155 | A1* | 1/2002 | Jamthe et al. | 455/517 |
| 2004/0044774 | A1* | 3/2004 | Mangalik et al. | 709/227 |
| 2004/0088348 | A1* | 5/2004 | Yeager et al. | 709/202 |
| 2007/0204008 | A1* | 8/2007 | Sindoni | 709/217 |
| 2008/0010660 | A1* | 1/2008 | Sumiyoshi | 725/105 |
| 2009/0291677 | A1* | 11/2009 | Lauby et al. | 455/418 |
| 2009/0328228 | A1* | 12/2009 | Schnell | 726/26 |
| 2011/0225417 | A1* | 9/2011 | Maharajh et al. | 713/150 |
| 2013/0007208 | A1* | 1/2013 | Tsui et al. | 709/217 |

* cited by examiner

*Primary Examiner* — Matthew Smithers

(57) ABSTRACT

A contents management method and apparatus of a mobile terminal provides improved security of private contents. A contents management method of a mobile terminal includes establishing a connection to at least one external terminal. The method also includes segmenting a content stored in the mobile terminal into segments and sharing the content by distributing the segments to the terminals. The method further includes integrating the segments distributed to the terminals into the content when a content execution command is input. The method still further includes storing the integrated content and deleting the integrated content in the mobile terminal when at least one of the terminals is disconnected.

20 Claims, 10 Drawing Sheets

CONTENT MANAGEMENT METHOD AND APPARATUS OF MOBILE TERMINAL

CROSS-REFERENCE TO RELATED APPLICATION(S) AND CLAIM OF PRIORITY

The present application is related to and claims the benefit under 35 U.S.C. §119(a) to a Korean patent application filed in the Korean Intellectual Property Office on Jan. 10, 2011 and assigned Serial No. 10-2011-0002310, the entire disclosure of which is hereby incorporated by reference.

TECHNICAL FIELD OF THE INVENTION

The present invention generally relates to a mobile terminal and, in particular, to a contents management method and apparatus of a mobile terminal for improving security of private contents.

BACKGROUND OF THE INVENTION

With the widespread use of mobile technologies, the mobile terminal is becoming one of the everyday commodities in modern life. Recently, the mobile terminals have evolved to be multimedia communication devices supporting various data transmission and supplementary services as well as traditional voice communication service.

Recent mobile terminals support multimedia functions such as still/motion picture recoding function, image view function, voice recoding function, audio playback function, and document view function such that the user can create and save contents with these functions. As it becomes common to share data, diverse data sharing techniques are developed for the users to share various types of data such as document and still and motion pictures.

As data sharing techniques are diversified and used in various fields, it becomes more and more important to secure the private information and business secrets of companies. Recently, it is common to share the secret documents such as business contracts, internal recordings of business, and private conference records by means of mobile terminals and thus the loss of the mobile terminal or illegal public opening of the documents stored in the mobile terminal can cause significant security problems.

SUMMARY OF THE INVENTION

To address the above-discussed deficiencies of the prior art, it is a primary object of the present invention to provide a content management method and apparatus of a mobile terminal that is capable of improving security of private contents.

In accordance with an aspect of the present invention, a contents management method of a mobile terminal includes establishing a connection to at least one external terminal. The method also includes segmenting a content stored in the mobile terminal into segments. The method further includes sharing the content by distributing the segments to the terminals. The method still further includes integrating, when a content execution command is input, the segments distributed to the terminals into the content; storing the integrated content. The method also includes deleting, when at least one of the terminals is disconnected, the integrated content in the mobile terminal.

In accordance with another aspect of the present invention, a mobile terminal includes a segmentation module configured to segment a content into a plurality of segments. The mobile terminal also includes a segments database configured to store some of the segments. The mobile terminal further includes a short range communication module configured to establish a connection with at least one external terminal and transmit the segments that remain after storing in the segments database to the at least one external terminal. The mobile terminal still further includes an integration module configured to integrate, when a content execution command is input, the segments stored in the at least one external terminal and the mobile terminal into the content. The mobile terminal also includes an integrated content database configured to store the integrated content. The mobile terminal further includes a deletion module configured to delete the integrated content from the mobile terminal when the connection is released.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged mobile terminal. In the following description, the description is directed to a mobile terminal equipped with a short range communication module such as information processing and multimedia devices including a cellular phone, a Portable Multimedia Player (PMP), a Personal Digital Assistant (PDA), a Smartphone, and a MP3 player.

According to embodiments of the present invention, the short range communication unit can include at least one of a Near Field Communication (NFC) module, a Bluetooth module, an Infrared Network module, a Radio Frequency Identification (RFID) module, a ZigBee module, a WiFi module.

Figure 1:
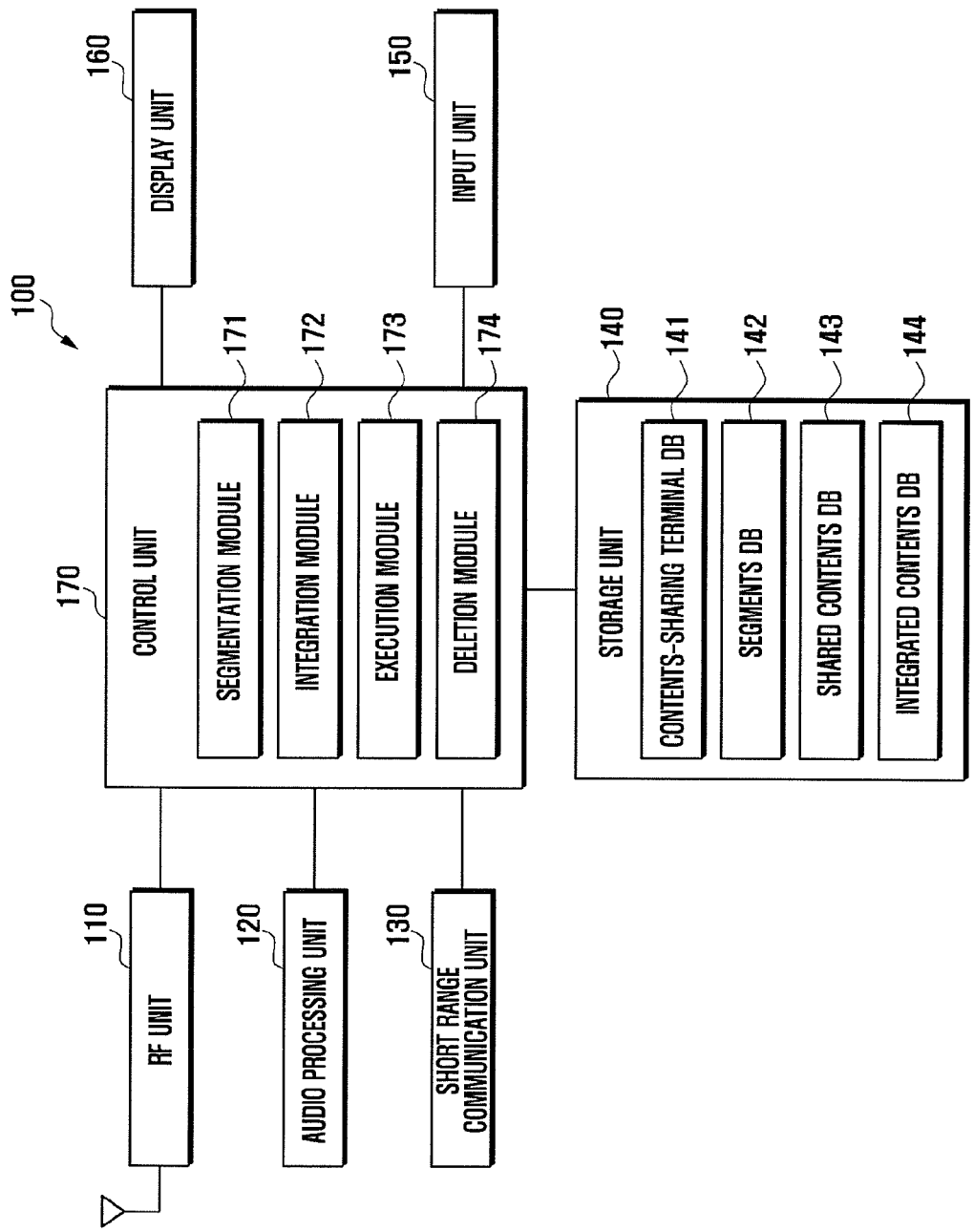
FIG. 1 illustrates a configuration of a mobile terminal according to an embodiment of the present invention.

FIG. 1 is a block diagram illustrating a configuration of a mobile terminal 100 according to an embodiment of the present invention.

The Radio Frequency (RF) unit 110 is responsible for transmitting and receiving radio signals carrying the incoming and outgoing data. The RF unit 110 includes an RF transmitter for up-converting and amplifying the transmit signal and an RF receiver for low noise amplifying and down-converting the receive signal. The RF unit 110 outputs the data received through a radio channel to the control unit 170 and transmits the data output by the control unit 170 over the radio channel.

The audio processing unit 120 can include a codec pack, and the codec pack can include a data codec for processing the packet data and an audio codec for processing audio data including voice. The audio processing unit 120 converts the digital audio signal to analog audio signal by means of the data codec so as to be output through a speaker (SPK) in the form of an audible sound wave and converts the analog signal input through a microphone (MIC) to a digital signal by means of the audio codec.

The short range communication module 130 is responsible for radio communication with another terminal or an Access Point (AP). According to an embodiment of the present invention, the short range communication unit 130 can be configured with at least one of a Bluetooth module, an NFC module, an RFID module, an Infrared Network module, and a WiFi module. According to an embodiment of the present invention, the short range wireless communication unit 130 can establish a connection to at least one external terminal. When the short range communication unit 130 is a Bluetooth module, the short range communication unit 130 broadcasts an inquiry signal and receives an inquiry response signal from at least one external terminal in response to the inquiry signal. The short range communication unit 130 requests the device name from the external terminal which has transmitted the inquiry response signal, and receives the device name transmitted by at least one external terminal. The device name is displayed on the screen of the display unit 160 of the mobile terminal 100 such that, when the user selects one of the device names presented on the screen, the short range communication unit 130 establishes a connection with the selected external terminal by checking the PIN value.

In the process for sharing contents with an external terminal, the short range communication unit 130 of the mobile terminal 100 transmits one of the segments of the content to be shared to the external terminal. Afterward, the mobile terminal 100 receives from the external terminal a save notification message for notifying of saving the segment of the content.

In the process for executing the content in the state connected to the external terminal, the mobile terminal 100 transmits a content integration request message to the external terminal and receives a content integration accept message from the external terminal by means of the short range communication unit. The mobile terminal 100 also transmits a segmented content request message to the external terminal and receives the segments transmitted by the external terminal in response to the segmented content request message by means of the short range communication unit 130. Once the segments are integrated into the original content, the mobile terminal transmits the integrated content to the external terminal by means of the short range communication unit 130.

When the content to be shared has a sharing validity duration according to an embodiment of the present invention, the mobile terminal 100 transmits the validity duration entered by the user to the external terminal and receives the message including the information rejecting or accepting the validity duration from the external terminal by means of the short range communication unit 130.

The storage unit 140 stores the programs and data necessary for the operations of the mobile terminal 100 and can be divided into a program region and a data region. The program region stores the programs for controlling general operations of the mobile terminal 100, Operating System (OS) for booting up the mobile terminal 100, application programs necessary from playing multimedia contents, and other application programs for supporting optional functions of the mobile terminal 100 such as camera function, audio playback function, still/motion picture playback function. The data region stores the data generated while the mobile terminal 100 is working such as still and motion pictures, phonebook, and audio data.

The storage unit 140 includes a contents-sharing terminal database (DB) 141, a segments DB 142, a shared contents list DB 143, and an integrated contents DB 144.

The contents-sharing terminal DB 141 stores a list of the external terminals to share certain contents. Before sharing a certain content, the mobile terminal user can register the external terminals to share contents. In this situation, the contents-sharing terminal DB 131 stores the list of the external terminals to share the contents. According to an embodiment of the present invention, the contents-sharing terminal DB 141 can store the list of the external terminals that are sharing the contents currently.

The segments DB 142 stores the segments of the contents. When the mobile terminal 100 stores some segments of a certain content and the external terminal stores other segments of the same content, the segments of the content are stored in the segmented content DB 142.

The shared contents list DB 143 stores the list of the contents that are currently shared. The shared contents list DB 143 can store the content name, device identities of the external terminals sharing the contents, and the storage paths of the contents.

The integrated content DB 144 stores the integrated content obtained by integrating the segments of the content. The integrated content DB 144 saves the integrated content temporarily such that, when the connection to the external terminal is released, the integrated content is deleted from the integrated content DB 144.

According to an embodiment of the present invention, the storage unit 140 can further store a validity duration DB (not shown). The validity duration DB stores, when the contents are configured with individual sharing validity durations, the validity durations of the contents. The mobile terminal 100 determines whether to delete the segments of the content from the segments DB 142 by referencing the validity durations of stored contents.

The input unit 150 receives a key input made by the user for controlling the mobile terminal 100 and generates an input signal to the control unit 170. The input unit 150 can be implemented with one of a 3×4 keypad and a QWERTY keypad having a plurality of alphanumeric keys and navigation keys or a touch panel. The input unit 150 also can include at least one of a button key, a jog key, and a wheel key. The input unit 150 generates the input signal for executing an application (related to the communication function, audio playback function, video playback function, picture display function, camera function, and DMB playback function) to the control unit 170. In an embodiment of the present invention, the input unit 150 receives the key input made by the user for selecting an external terminal for sharing contents, selecting a content to be shared with the external terminal, or sharing or executing the content, and generates an input signal to the control unit 170.

The display unit 160 can be implemented with one of a Liquid Crystal Display (LCD), an Organic Light Emitting Diode (OLED), and an Active Matrix OLED (AMOLED), and outputs the menu of the mobile terminal 100, input data, function settings, and other indicative information in the visual data format. The display unit 160 displays a booting screen, a standby screen, a menu screen, a call processing screen, and an application execution screen.

The control unit 170 controls the operations of the internal function blocks of the mobile terminal. According to an embodiment of the present invention, the control unit 170 includes a segmentation module 171, a integration module 172, an execution module 173, and a deletion module 174.

The segmentation module 171 is a component for segmenting the content to be shared with an external terminal. The segmentation module 171 can segment the content in units of bytes or bits. The segmentation unit 171 can segment a document content in units of characters (bytes) or bits more finely. The segmentation unit 171 can segment a video or audio content in units of bytes or bits and, especially when the content is large in size, in units of several bytes (four bytes or eight bytes).

The integration module 172 is a component for integrating the segments into an integrated content. The integration module 172 integrates the segments stored in the segments DB 142 and the segments received from the external terminal into an integrated content.

The execution module 173 is a component for executing the integrated content. The execution module 173 can execute the original content before the segmentation or the integrated content obtained by integrating the segments but cannot execute the segments.

The deletion module 174 is a component for deleting the integrated content stored in the integrated contents DB 144. The integrated content can exist in the state where the external terminal is connected to the mobile terminal 100 and, if the connection of the external terminal to the mobile terminal 100 is released, the corresponding content is deleted from the integrated contents DB 144 by the deletion module 174.

According to an embodiment of the present invention, the control unit 170 can further include a cipher/decipher module (not shown). The cipher/decipher module is a component for ciphering the content before or after segmentation and deciphering the ciphered content. The cipher/decipher module can perform, when the content to be shared with the external terminal is selected by the user, ciphering the selected content before being segmented. In the content ciphering process, the user can configure a password. When the segments are integrated into the content, the integrated content is still in the state ciphered. Before execution of the content, the display unit 160 presents a password entry window to the user such that, when the password entered by the user is verified, the cipher/decipher module performs decoding on the integrated content. The integrated content is transferred to the execution module 173 as deciphered data such that the execution module 173 executes the integrated content.

The cipher/decipher module can cipher the content after being segmented. When a password is configured for the segments of the content, the password entry window is presented to the user before integrating the segments such that, when the password entered by the user is verified, the cipher/decipher module performs deciphering on the segments of the content.

According to an embodiment of the present invention, the control unit 170 can further include a validity duration management module (not shown). The validity duration management module is a component for configuring and managing the validity duration for the segments of the content. If the user enters the validity duration of a content by means of the input unit 150, the validity duration information is transmitted to the external terminal to request for the accept of the user of the external terminal. If the validity duration accept message is received from the external terminal, the validity duration management module configures the validity duration of the content to be shared. The validity duration management module monitors to detect the expiry of the validity duration of the content and, when the validity duration of the content has expired, deletes the segments of the content from the segments DB 142.

With reference to the internal configuration of the mobile terminal that has been explained hereinabove, a description is made of the contents management method of the mobile terminal hereinbelow.

Figure 2:
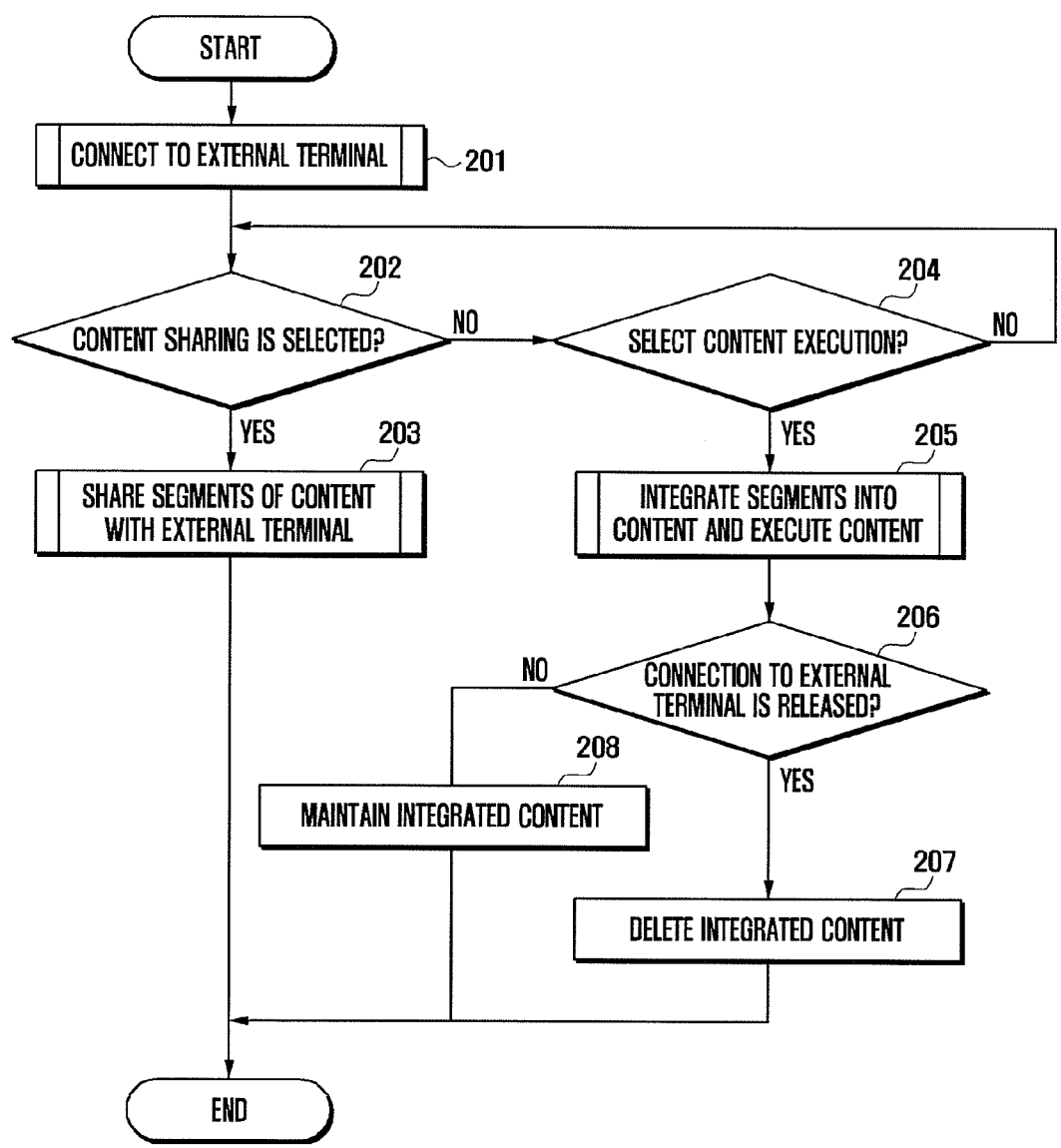
FIG. 2 illustrates a contents management method of a mobile terminal according to an embodiment of the present invention.

FIG. 2 is a flowchart illustrating a contents management method of a mobile terminal according to an embodiment of the present invention.

Referring to FIG. 2, the control unit 170 controls the short range communication unit 130 to establish a connection to at least one external terminal (201). The control unit 170 can establish the connection to one or more external terminals by means of the short range communication unit 130. The control unit 170 also can establish the external terminal which is already sharing the contents with the mobile terminal, the external terminal which is not sharing now but already registered to share the contents with the mobile terminal, and other external terminals. For the connection to the external terminal with which the contents are shared, the control unit 170 controls the display unit 160 to display all of the contents sharing menus and contents execution menus. For a connection to the external terminal with which the contents are not shared yet, the control unit 170 controls the display unit 160 to display only the contents sharing menus. Block 201 is described later in more detail with reference to FIG. 3.

According to an embodiment of the present invention, after establishing the connection to the external terminal by means of the short range communication unit, the control unit 170 controls the display unit 160 to display a list of the connected external terminals. If the user selects at least one external terminal from the list, the control unit 170 determines that the selected external terminal is intended to share the contents with the mobile terminal.

Once the mobile terminal has established the connection to the external terminal at block 201, the control unit 170 determines whether a content sharing is selected by means of the input unit 150. If the content sharing is selected, the display unit 160 displays the content sharing menu such that the user can select the content sharing menu item to share the content with the currently connected external terminal.

If the content sharing menu item is selected, the control unit 170 segments the content and shares the segments of the content with the currently connected external terminal (203). The control unit 170 segments the content into plural segments and stores some of the segments in the segments DB 142 and transmits the other segments to the external terminal by means of the short range communication unit 130. That is, some segments of the content is saved in the mobile terminal 100 and the other segments are saved in the external terminal. Block 203 is described later in more detail with reference to FIG. 4.

If the content sharing is not selected at block 202, the control unit 170 determines whether the content execution is selected by means of the input unit 150 (block 204). When the currently connected external terminal is the terminal sharing the content with the mobile terminal, the display unit 160 displays the content execution menu along with the content sharing menu. If it is intended to execute the shared content, the user selects the content execution menu by means of the input unit.

If the content execution is selected at block 204, the control unit 170 integrates the segments into the content and executes the content (block 205). The control unit 170 receives the segments of the content from the external terminal by means of the short range communication unit 130, retrieves the segments of the content from the segment DB, and integrates the segments into the integrated content. Next, the control unit 170 executes the integrated content. Block 205 is described later in more detail with reference to FIG. 5.

The control unit 170 monitors to detect a user input and, if a user input is detected, determines whether the user input is a connection release command (block 206). When the distance between the mobile terminal 100 and the external terminal increases, the connection between the mobile terminal 100 and the external terminal is released. The short range communication unit 130 notifies the control unit 170 of the release of the connection such that the control unit 170 recognizes the release of the connection.

If the connection release command is input at block 206, the control unit 170 deletes the integrated content shared with the external terminal from the integrated content DB 144 (block 207) and, otherwise, maintains the integrated content as shared with the external terminal. That is, the integrated content exists only when the mobile terminal is connected with the external terminal sharing the contents such that, when the connection to the external terminal is released, the integrated content is deleted. In this situation, the external terminal detects the connection release so as to delete the saved integrated content.

According to an embodiment of the present invention, when the mobile terminal 100 shares the content with an external terminal, the control unit 170 can configure the sharing validity duration of the content. The content is segmented so as to be stored in the segments DB 142 and maintained in the segments DB 142 before the expiry of the sharing validity duration. The control unit 170 determines whether the sharing validity durations have been expired such that the segments of the content of which sharing validity duration has been expired is deleted from the segments DB 142. The sharing validity duration configuration is described later in more detail with reference to FIG. 10.

Figure 3:
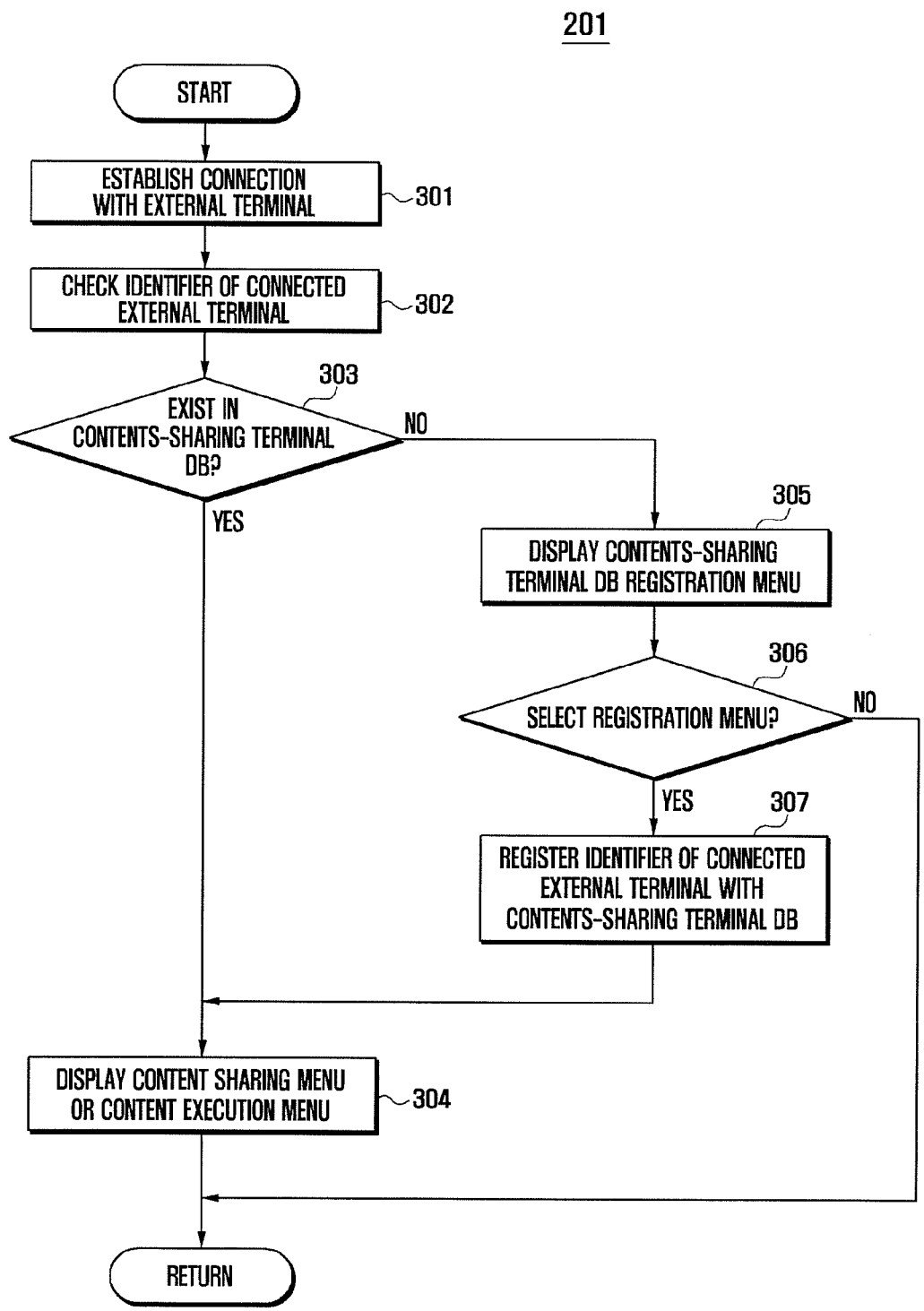
FIG. 3 illustrates greater detail of the connection establishment block of FIG. 2.

FIG. 3 is a flowchart illustrating greater detail of the connection establishment block 202 of FIG. 2.

Referring to FIG. 3, the control unit 170 controls the short range communication unit 130 to establish a short range communication channel with the external terminal (block 301). In the communication channel establishment process, the control unit 170 receives the device identifier of the external terminal by means of the short range communication terminal. The identifier of the external terminal can be a Bluetooth address (BD-ADD) for Bluetooth communication and a MAC address for WiFi communication.

Once the communication channel has been established, the control unit 170 checks the identifier of the connected external terminal (block 302) and determines whether the checked identifier is in the contents-sharing terminal DB 141 (block 303). The contents-sharing terminal DB 141 includes the list of the external terminals that are currently sharing the contents with the mobile terminal 100 or the list that are registered already for sharing the contents. For the purposes of security and reliability of the contents, the external terminals with which the contents are shared are registered in advance such that the contents can be shared only with the registered external terminals.

If the identifier is in the contents-sharing terminal DB 141 at block 303, the control unit 170 controls the display unit 160 to displays the content sharing menu and/or the content execution menu (block 304). The control unit 170 controls the display unit 160 to display both the content sharing menu and the content execution menu when the external terminal is sharing the content with the mobile terminal 100, and only the content sharing menu when external terminal is not sharing the content with the mobile terminal 100.

If the identifier is not in the contents-sharing terminal DB 141 at block 303, the control unit 170 controls the display unit 160 to display a contents-sharing terminal DB registration menu (block 305). In order to register an external terminal with the external terminal list, the user can select the contents-sharing terminal DB registration menu by means of the input unit 150.

In the state where the contents-sharing terminal DB registration menu is displayed, the control unit 170 determines whether a registration menu item is selected by means of the input unit (block 306) and, if the registration menu item is selected, registers the identifier of the currently connected external terminal with the contents-sharing terminal DB 141 (block 307).

According to an embodiment of the present invention, the control unit 170 controls the display unit 160 to further display a contents-sharing terminal registration release menu addition at block 304. The user can delete the currently connected external terminal from the contents-sharing terminal DB 141. If the user selects the registration release menu by means of the input unit 150, the control unit 170 deletes the identifier of the currently connected external terminal from the contents-sharing terminal DB 141. When the external terminal of which identifier is deleted from the contents-sharing terminal DB 141 is sharing a content with the mobile terminal 100, the control unit 170 deletes the segments of the content shared with the external terminal from the segments DB 142. When the integrated content of the segments is stored in the integrated contents DB 144, the control unit 170 deletes the integrated content also.

According to an embodiment of the present invention, the control unit 170 can control the display unit 160 to further display the list of the contents-sharing terminals registered with the contents-sharing terminal DB 141 at block 304. If the user selects a terminal from the contents-sharing terminal list, the control unit 170 checks whether the selected terminal is currently connected and whether the selected terminal is sharing a content with the mobile terminal and controls the display unit 160 to display the connection status of the external terminal and information on the contents shared with the external terminal.

Figure 4:
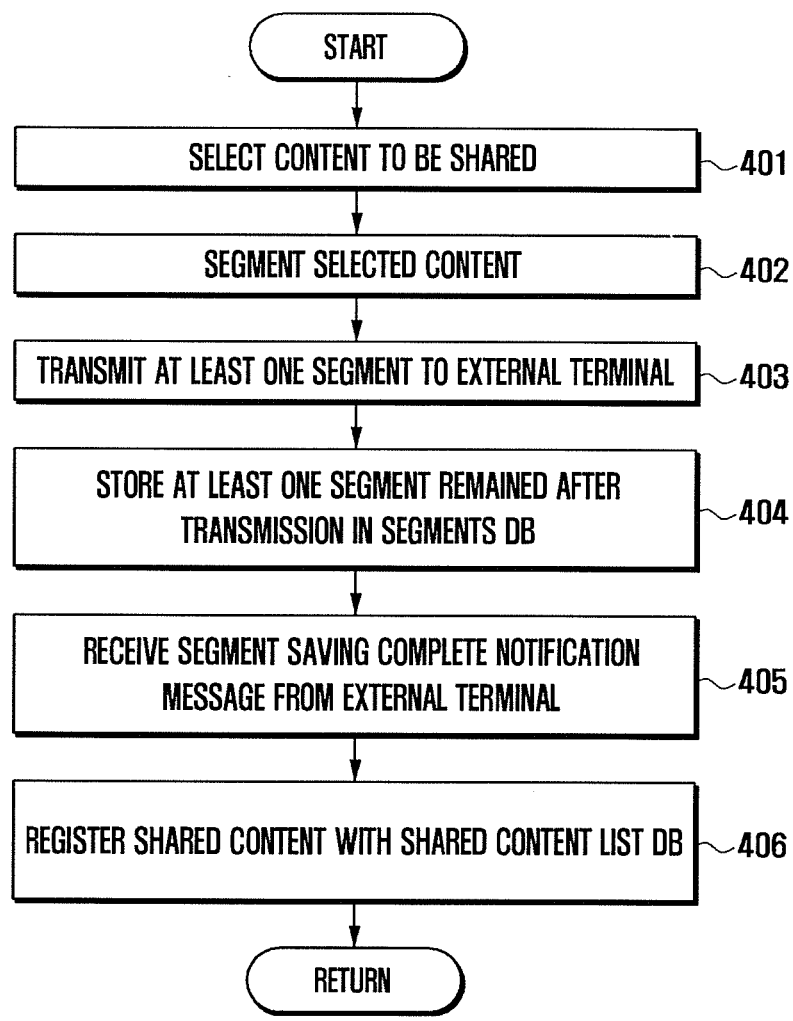
FIG. 4 illustrates greater detail of the content sharing block of FIG. 2.

FIG. 4 is a flowchart illustrating greater detail of the content sharing block 203 of FIG. 2.

Referring to FIG. 4, the control unit 170 selects the content to be shared in response to a user command input by means of the input unit 150 (block 401). Once the content sharing has been selected at block 202, the control unit 170 controls the display unit 160 to display the list of the contents stored in the storage unit 140. If the user selects a content from the contents list, the control unit 170 recognizes the content selected by means of the input unit 150.

Once the content to be shared has been selected at block 401, the control unit 170 segments the selected content into segments by means of the segmentation module 171 (block 402). The segmentation unit 171 can segment the content in unit of byte or bit. The segmentation unit 171 can segment a document content in unit of character (byte) or bit more finely. The segmentation unit 171 can segment a video or audio content in units of bytes or bits and, especially when the content is large in size, in units of several bytes (four bytes or eight bytes). Assuming that the number of the external terminal to share the content is N, the segmentation unit 171 can segment the content into N+1 segments.

Next, the control unit 170 transmits at least one segment to the external terminal by means of the short range communication unit 130. After segmenting the content, the control unit 170 transmits the individual segments to at least one external terminal. For example, assuming that the number of the external terminals to share the content is five, the segmentation unit 171 can segment the content into six segments (n1 to n6) and then transmit the individual segments of n2 to n6 to the five external terminals respectively.

Next, the control unit 170 saves at least one segment that is not transmitted to the external terminal in the segments DB 142 (block 404). That is, the control unit 170 stores some of the segments of the content in the segments DB 142 as the internal storage. In the aforementioned example, the control unit 170 stores the segment n1 that remains after transmitting the segments n2 to n6 to the external terminals in the segments DB 142.

The control unit 170 receives the save complete notification message notifying of the safe receipt of the segment from at least one external terminal by means of the short range communication unit 130 (block 405). The external terminal stores the segments received from the mobile terminal in its internal storage. After storing the received segments, the external terminal transmits the save complete notification message to the mobile terminal 100 and the control unit 170 of the mobile terminal 100 receives the save complete notification message by means of the short range communication unit 130. According to an embodiment of the present invention, the save complete notification message can include the location where the segment is stored (Uniform Resource Identifier, or URI) and content file path.

Upon receipt of the save complete notification message, the control unit 170 registers the shared content with the shared contents list DB 143 (block 406). The control unit 170 can save the shared content name (ID) and the identifier of the external terminal sharing the content in the shared contents list DB 143.

According to an embodiment of the present invention, the control unit 170 can control the display unit 160 to display the list of the terminals sharing the content which is stored in the contents-sharing terminal DB 141 prior to block 401. If the user selects at least one external terminal from the list by means of the input unit 150, the control unit 170 determines whether the at least one external terminal is connected to the mobile terminal 100 and, if so, the procedure goes to block 402 and, otherwise, controls the display unit 160 to display a message notifying that there is no available external terminal to share the content.

According to an embodiment of the present invention, the control unit 170 can cipher the selected content after block 401. In this situation, the control unit 170 can include a cipher/decipher module (not shown) for ciphering/deciphering the content and can control the display unit to display a password entry window. If the user enters a correct password, the cipher/decipher module performs ciphering on the content with the password. The password is shared with the users of the external terminals sharing the content such that the content is executed in the external terminal with the correct password input.

According to an embodiment of the present invention, the cipher/decipher module can perform ciphering on the content before the segments are stored in the segments DB 142 after block 403. In this situation, the cipher/decipher module can control the display unit 160 to display the password entry window to cipher the segmented content in association with the password input through the password entry window. The external terminal also saves the segmented content after being ciphered. At this time, the external terminal can save the segmented content with a password different from that used in the mobile terminal. The mobile terminal 100 receives the segments from the external terminal sharing the segmented content in order to integrate the segments distributed to the external terminal, and the deciphering process is necessary for integrating these segments into the original content. Since the segments are saved with different passwords in the respective terminals, it is possible to improve the security of the shared content.

Figure 5:
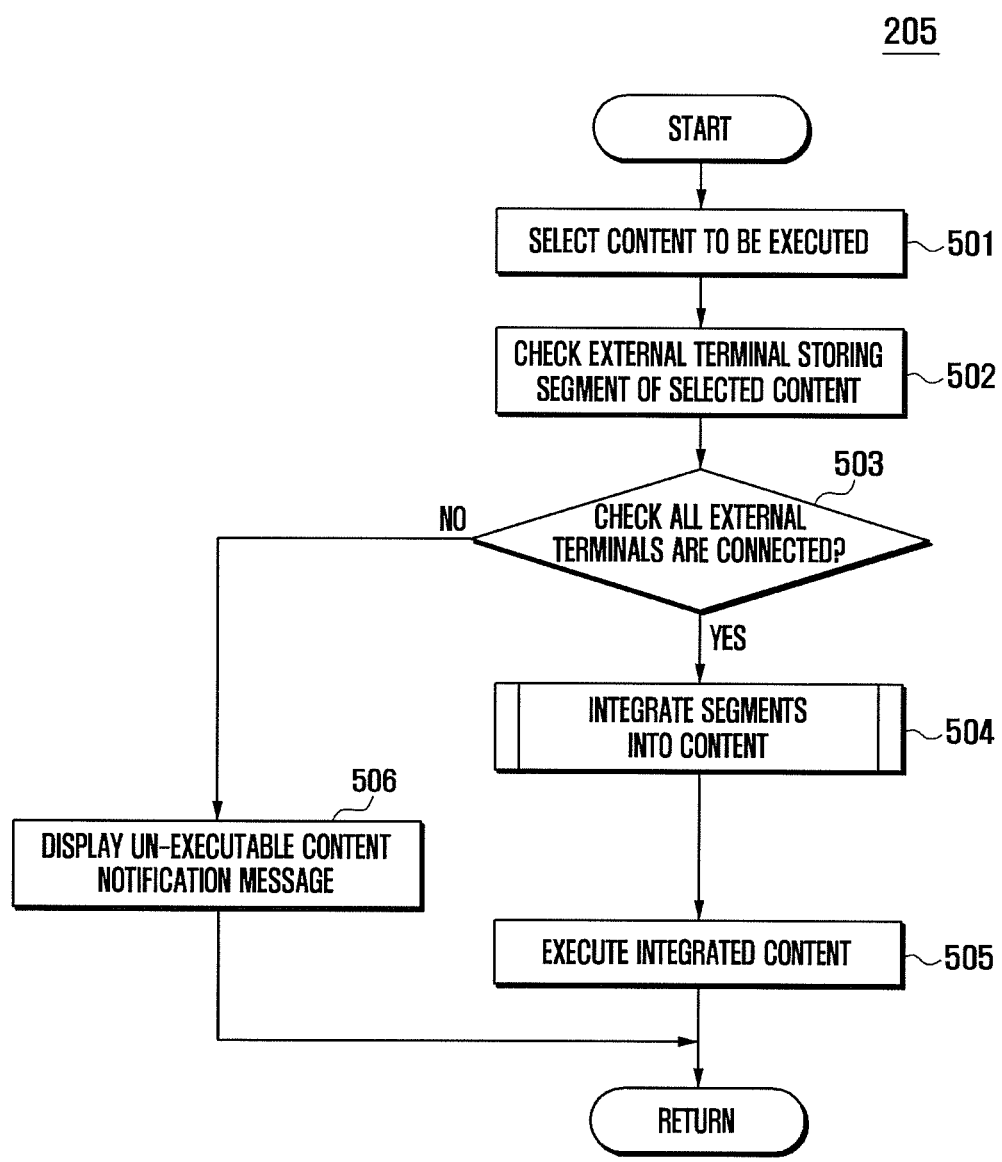
FIG. 5 illustrates greater detail of the segment integration and execution block of FIG. 2.

FIG. 5 is a flowchart illustrating greater detail of the segment integration and execution block 205 of FIG. 2.

Referring to FIG. 5, the control unit 170 selects the content to be executed in response to the user command input by means of the input unit 150. If the content execution command is input, the control unit 170 controls the display unit 160 to display the shared contents list stored in the shared-contents list DB 143 (block 501). If the user selects a content from the shared contents list, the control unit 170 recognizes the content selected by means of the input unit 150.

Next, the control unit 170 checks the external terminals with which the selected content is shared in the form of segments of the content (block 502). The control unit 170 checks the external terminals storing the segments of the content selected by the user by referencing the shared-contents list DB 143.

Next, the control unit 170 determines whether all of the checked external terminals are connected with the mobile terminal (block 503). When the external terminals A1 and A2 store the segment C of the content, the control unit 170 determines, when only the external terminal A1 is connected to the mobile terminal 100, that not all of the external terminals sharing the content C are connected to the mobile terminal and, when both of the terminals A1 and A2 are connected to the mobile terminal 100, that all of the external terminals are connected to the mobile terminal.

If it is determined that all of the checked external terminals are connected to the mobile terminal 100, the control unit 170 integrates the segments distributed to the terminals into an integrated content (block 504). The control unit 170 receives the segments of the content from the external terminals by means of the short range communication unit 130 and integrates the received segments with the segments stored in the segments DB 142 into the integrated content. The segment integration block is described later in more detail with reference to FIGS. 6 to 9.

After integrating the segments into the original content, the execution module executes the integrated content (block 505). When the content is ciphered before being segmented, the control unit 170 controls the display unit 160 to display the password entry window such that, when the correct passed is entered, the cipher/decipher module deciphers the content. Afterward, the execution module 173 executes the deciphered content.

If it is determined that not all of the checked external terminals are connected to the mobile terminal 100 at block 503, the control unit 170 controls the display unit 160 to display the message notifying that the content execution is not allowed (block 506).

According to an embodiment of the present invention, the control unit 170 controls the display unit 160 to display the list of the external terminals that are connected currently, prior to block 501, such that the at least one external terminal selected by the user and the shared contents list are presented to the user. If the user selects at least one content from the content list at block 501, the control unit 170 requests the external terminals for the segments of the selected content and integrates the segments received from the external terminals and the segments of the content stored in the segments DB 142 into the original content.

Figure 6:
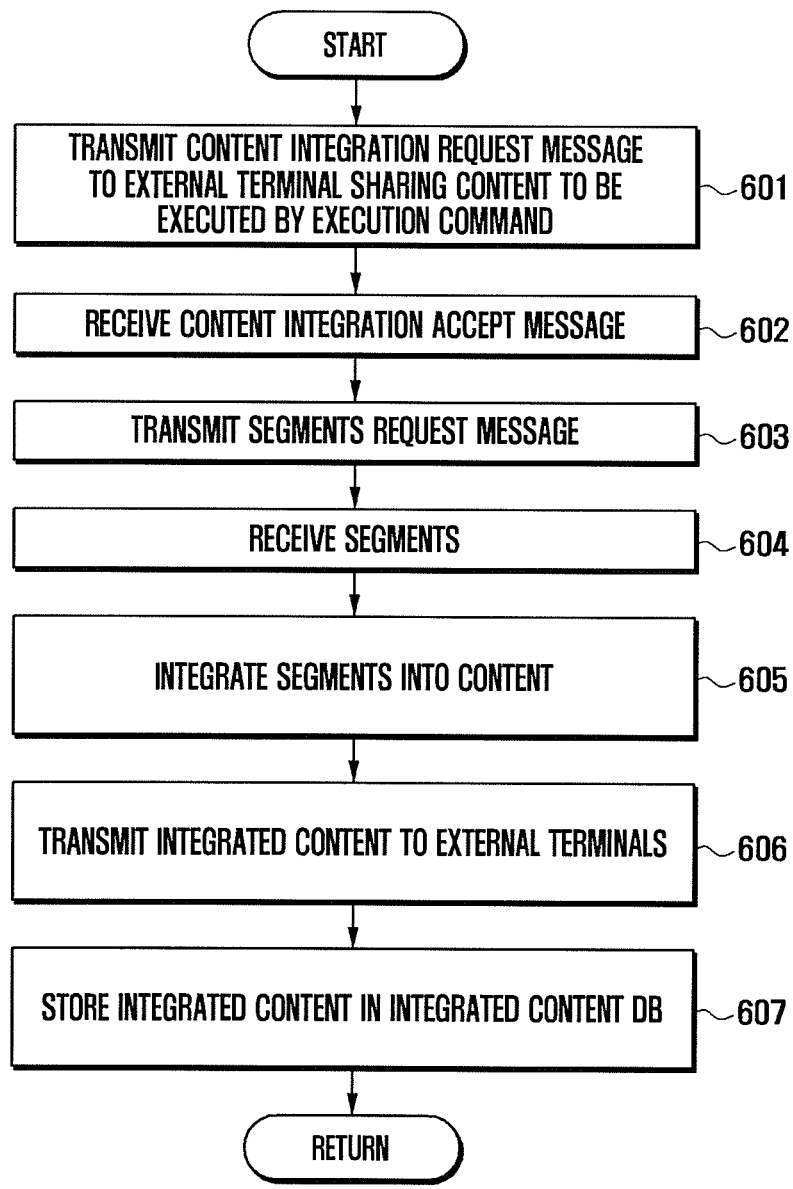
FIG. 6 illustrates greater detail of the segments integration block of FIG. 5.

FIG. 6 is a flowchart illustrating greater detail of the segments integration block 504 of FIG. 5.

Referring to FIG. 6, the control unit 170 controls the short range communication unit 130 to transmit a content integration request message to at least one external terminal sharing the content for which the execution command is input (block 601). The control unit 170 controls the short range communication unit 130 to transmit the content integration request message to at least one external terminal saving the segments of the content for which the execution command is input.

After transmitting the content integration request message, the control unit receives a content integration accept message from the at least one external terminal by means of the short range communication unit 130 (block 602). If the content integration request message is received from the mobile terminal 100, the external terminal displays a message asking whether to accept the content integration request and transmits, if the user inputs a command for accepting the content integration request, the content integration accept message to the mobile terminal 100. The control unit 170 of the mobile terminal 100 receives the content integration accept message from at least one external terminal storing the segments of the content to be executed by means of the short range communication unit 130. At this time, the control unit 170 can determine whether the content integration accept message is received from all of the external terminals storing the segments of the content to be executed. If the content integration accept message is not received from at least one of the external terminals storing the segments of the content to be executed, the control unit 170 controls the display unit 160 to display an alarm message notifying unavailable execution.

If the content integration accept message is received from all of the external terminals storing the segments of the content to be executed, the control unit 170 controls the short range communication unit 130 to transmit a segments request message to the external terminals that have transmitted the content integration accept message (block 603).

Upon receipt of the segments request message from the mobile terminal 100, the external terminal transmits the segments of the content to be executed to the mobile terminal 100. When the segments are ciphered, the external terminal transmits the segments before or after being deciphered.

The control unit 170 receives the segments transmitted by the external terminals by means of the short range communication unit 130 (block 604).

Next, the control unit 170 integrates the segments into the original content (block 605). The integration module 172 integrates the segments received from the external terminals and the segments stored in the segments DB 142 into the original content. When the segments are ciphered, the cipher/decipher module performs deciphering on individual segments and integrates the deciphered segments into the original content.

After recovering the original content, the control unit 170 controls the short range communication unit 130 to transmit the integrated content to the external terminals sent the segments of the content (block 606). When the content is ciphered before being segmented, the integrated content is in the state as ciphered such that the control unit 170 can transmit the integrated content before or after being ciphered.

After transmitting the integrated content, the control unit 170 saves the integrated content in the integrated content DB 144 (607). The integrated content is saved in the integrated content DB 144 temporarily.

Figure 7:
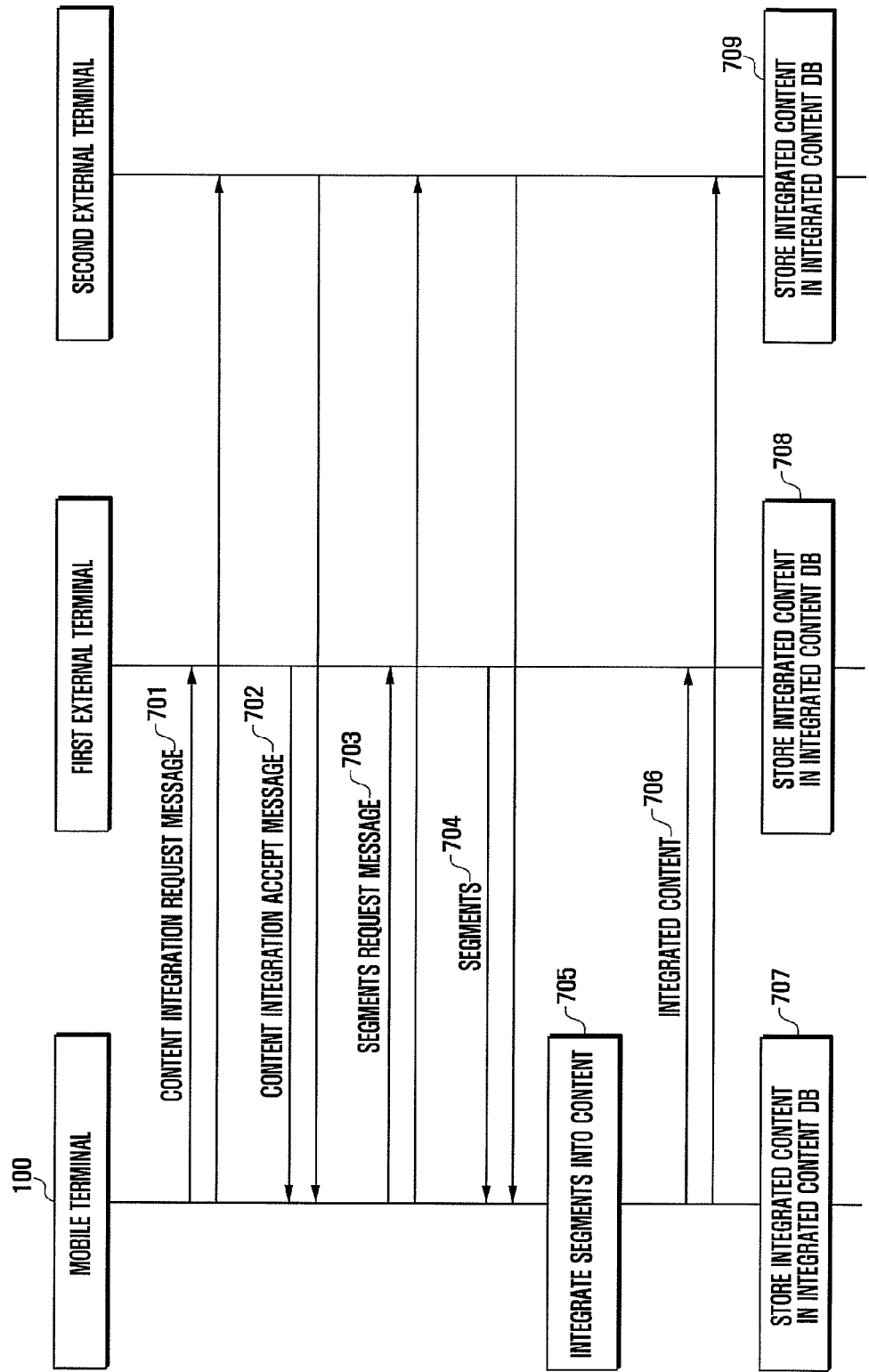
FIG. 7 illustrates operations of the mobile terminal and external terminals in the segments integration block of FIG. 5 according to an embodiment of the present invention.

FIG. 7 is a signaling diagram illustrating operations of the mobile terminal 100 and external terminals in the segments integration block 504 of FIG. 5 according to an embodiment of the present invention.

The mobile terminal 100 and the first and second external terminals are sharing the content targeted by the execution command input by the user, and the terminals store the segments of the content targeted by the execution command.

The mobile terminal 100 transmits the content integration request message to the first and second external terminals (701). Upon receipt of the content integration request message, each of the first and second external terminals transmits the content integration accept message to the mobile terminal 100 (702). The mobile terminal 100 determines whether the content integration accept message is received from both of the first and second external terminals. If the content integration accept message is not received from at least one of the two external terminals, the mobile terminal 100 displays an un-executable content alarm message.

If the content integration accept message is received from both of the first and second external terminals, the mobile terminal 100 transmits a segments request message to the first and second external terminals (703). Upon receipt of the segments request message, each of the first and second external terminals transmits the segments stored in its storage to the mobile terminal 100 (704).

The mobile terminal 100 integrates the segments received from the first and second external terminals and the segments stored in the segments DB 142 into the original content (705).

When the segments are ciphered, the mobile terminal 100 performs deciphering on the individual segments and then integrates the deciphered segments. Assuming that the segments stored in the mobile terminal 100 are ciphered with a password A, the segments stored in the first external terminal with a password B, and the segments stored in the second external terminal with a password C, the mobile terminal 100 can integrate the segments into the original content correctly only when all of the passwords A, B, and C are entered correctly. Once the segments are integrated into the original content correctly, the mobile terminal 100 transmits the integrated content to the first and second external terminals (706).

The mobile terminal 100 stores the integrated content in the integrated content DB 144 (707). The first and second external terminals save the integrated content received from the mobile terminal 100 in the integrated content DB of their internal storages (708 and 709).

Each of the mobile terminal 100 and the first and second external terminals can execute the integrated content. When the first and second external terminals receive the integrated content as ciphered, the integrated content can be executed only when the correct password is entered. When at least one of the mobile terminal 100 and the first and second external terminals is disconnected, the integrated content is deleted in all of the terminals.

Figure 8:
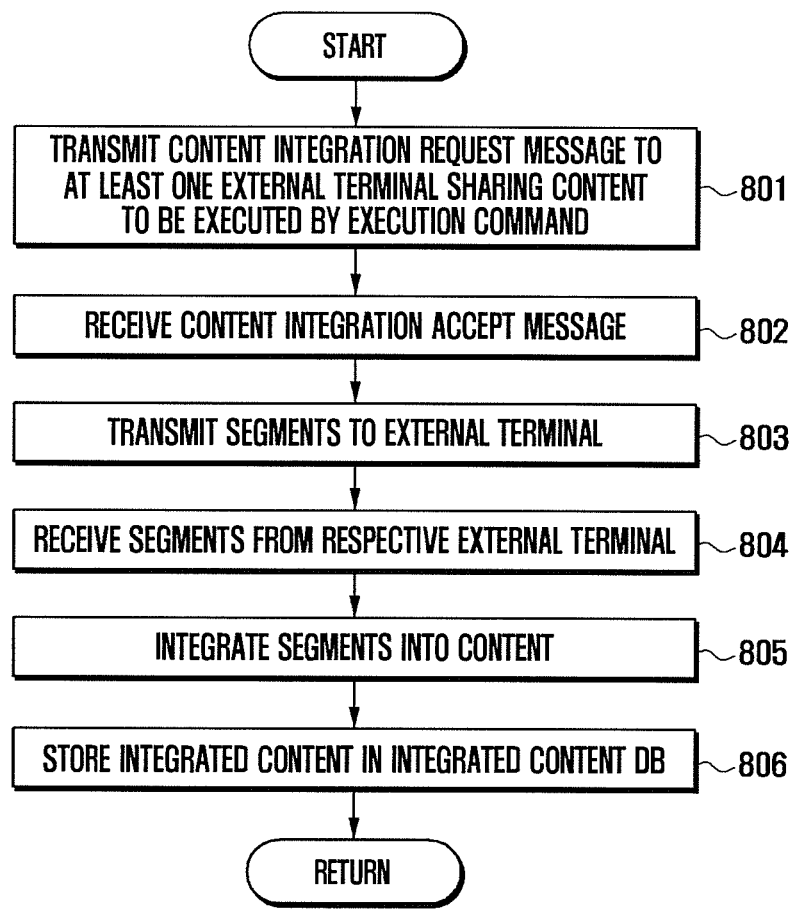
FIG. 8 illustrates greater detail of the segments integration block of FIG. 5.

FIG. 8 is a flowchart illustrating greater detail of segments integration block 504 of FIG. 5.

The control unit 170 controls the short range communication unit 130 to transmit the content integration request message to at least one external terminal sharing the content for which the execution command is input (block 801). The content integration message can include the information on the terminal sharing the content to be executed by the execution command. Next, the control unit 170 receives the content integration accept message from the at least one external terminal by means of the short range communication unit 130 (block 802). Upon receipt of the content integration request message, the external terminal displays a message asking for whether to accept the content integration. The external terminal transmits, if the user enter a key to accept the content integration, the content integration accept message to the mobile terminal 100. The control unit 170 of the mobile terminal 100 receives the content integration accept message from the at least one external terminal storing the segments of the content for which the execution command is input by means of the short range communication unit 130. At this time, the control unit 170 can determine whether the content integration accept message is received from all of the external terminals storing the segments of the content to be executed by the execution command. If the content integration accept message in not received from at least one external terminal, the control unit 170 can control the display unit to display a content execution unavailable alarm message.

If the content integration accept message is received from all of the external terminals storing the segments of the content to be executed, the control unit 170 transmits segments of the content stored in the segment DB 142 to the external terminals by means of the short range communication unit 130 (block 803). When the segments are ciphered, the control unit 170 can transmit the segments to the external terminals before or after being deciphered.

If the mobile terminal 100 transmits the segments, this means that the mobile terminal 109 accepts the content integration such that the external terminal transmits the segments stored in its storage to the mobile terminal and other external terminals sharing the content to be executed by the execution command. When the segments are ciphered, the external terminal can transmit the segments, before or after being deciphered, to the mobile terminal 100 and the other external terminals.

The control unit 170 receives the segments from the respective external terminals by means of the short range communication module 130 (block 804).

The integration module 172 integrates the segments into the original content (block 805). The integration module 172 integrates the segments received from the external terminals and the segments stored in the segments DB 142 into the original content before segmentation. When the segments are ciphered, the cipher/decipher module performs deciphering on the individual segments, and the integration module 172 integrates the deciphered segments into the original content. Each external terminal also integrates the segments stored in its storage and the segments received from other terminals into the original content.

Finally, the control unit 170 saves the integrated content in the integrated content DB 144 (block 806). The integrated content is stored in the integrated content DB 144 temporarily.

Figure 9:
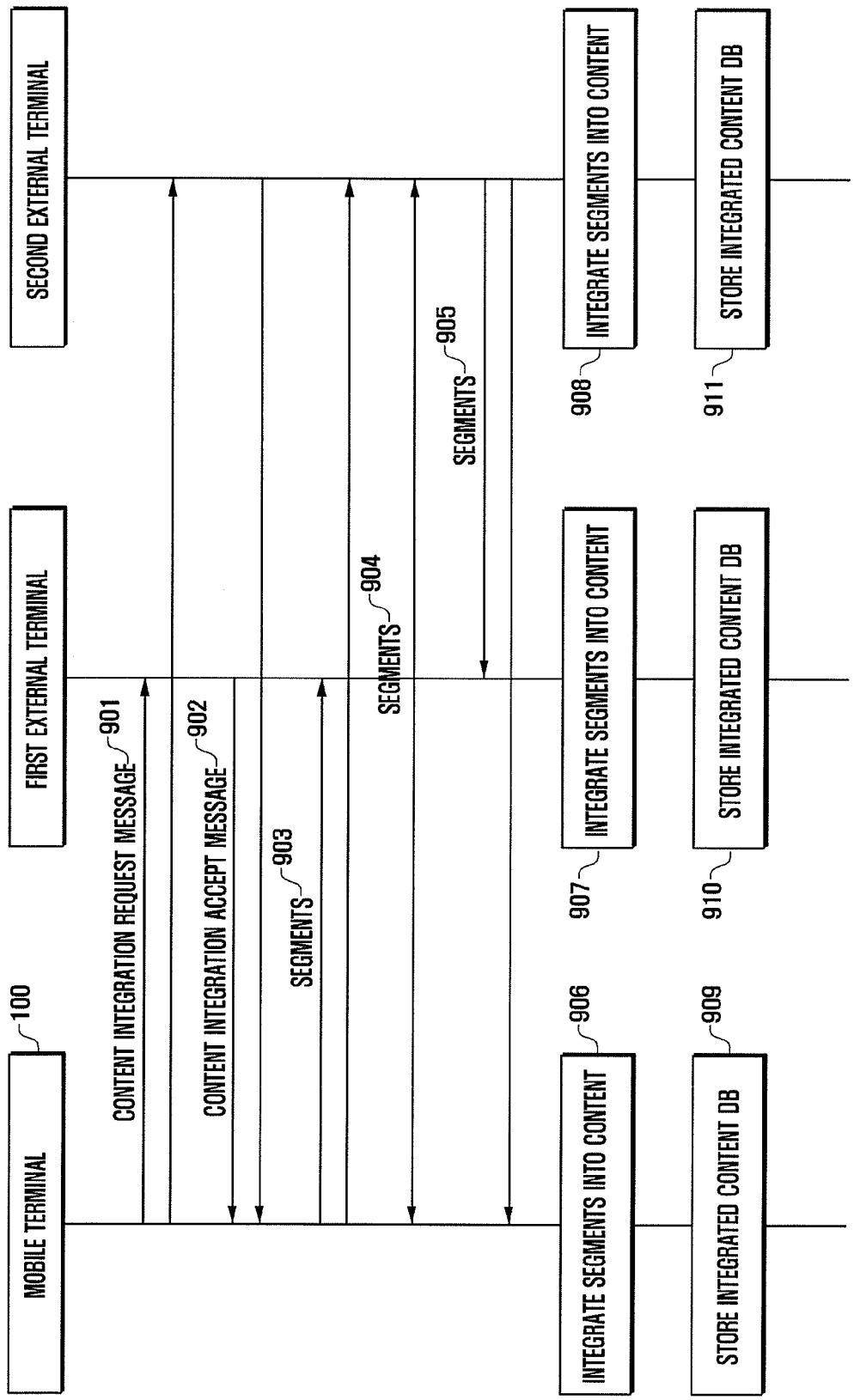
FIG. 9 illustrates operations of the mobile terminal and external terminals in the segment integration block of FIG. 5 according to another embodiment of the present invention.

FIG. 9 is a signaling diagram illustrating operations of the mobile terminal 100 and external terminals in the segment integration block 504 of FIG. 5 according to another embodiment of the present invention.

The mobile terminal 100 and the first and second external terminals are sharing the content targeted by the execution command input by the user, and the terminals store the segments of the content targeted by the execution command.

The mobile terminal 100 transmits the content integration request message to the first and second external terminals (901). The content integration request message can include the information on the terminals, i.e. the mobile terminal 100 and the first and second external terminals, sharing the content. Upon receipt of the content integration request message, each of the first and second external terminals transmits the content integration accept message to the mobile terminal 100 (902). The mobile terminal 100 determines whether the content integration accept message is received from both the first and second external terminals sharing the content targeted by the execution command. If the content integration accept message is not received from at least one of the two external terminals, the mobile terminal 100 displays a unexecutable content alarm message.

If the content integration accept message is received from both the external terminals, the mobile terminal 100 transmits the segments stored in its own storage to the first and second external terminals (903). Upon receipt of the segments, each of the first and second external terminals recognizes that all of the terminals sharing the content accept the content integration and thus transmits the segments stored in its own storage to other terminals. The first external terminal transmits the segments stored in its storage to the mobile terminal 100 and the second external terminal (904), and the second external terminal transmits the segments stored in its storage to the mobile terminal 100 and the first external terminal (905).

The mobile terminal 100 integrates the segments received from the first and second external terminals and the segments stored in the segment DB 142 into the original content before being segmented (906). When the segments are ciphered, the mobile terminal 100 performs deciphering on the individual segments and then integrates the deciphered segments into the original content. The first external terminal integrates the segments received from the mobile terminal 100 and the second external terminal and the segments stored in its storage into the original content (907), and the second external terminal integrates the segments received from the mobile terminal and the first external terminal and the segments stored in its storage into the original content (908).

The mobile terminal saves the integrated content in the integrated content DB 144 (909), and the first and second external terminals also save the integrated content in the integrated content DBs of their storage respectively (910 and 911).

The integrated content can be executed in each of the mobile terminal 100 and the first and second external terminals. When the first and second external terminals receive the integrated content as ciphered, the integrated content can be executed with a correct password. When at least one of the mobile terminal 100 and the first and second external terminals is disconnected, the integrated content is deleted in all of the terminals.

According to an embodiment of the present invention, the procedure can further include a block for configuring sharing validity duration between blocks 401 and 402. If the user selects the content to be shared, the control unit 170 can control the display unit 160 to display the sharing validity duration configuration menu. The user can configure the sharing validity duration of the content with the sharing validity duration configuration menu.

Figure 10:
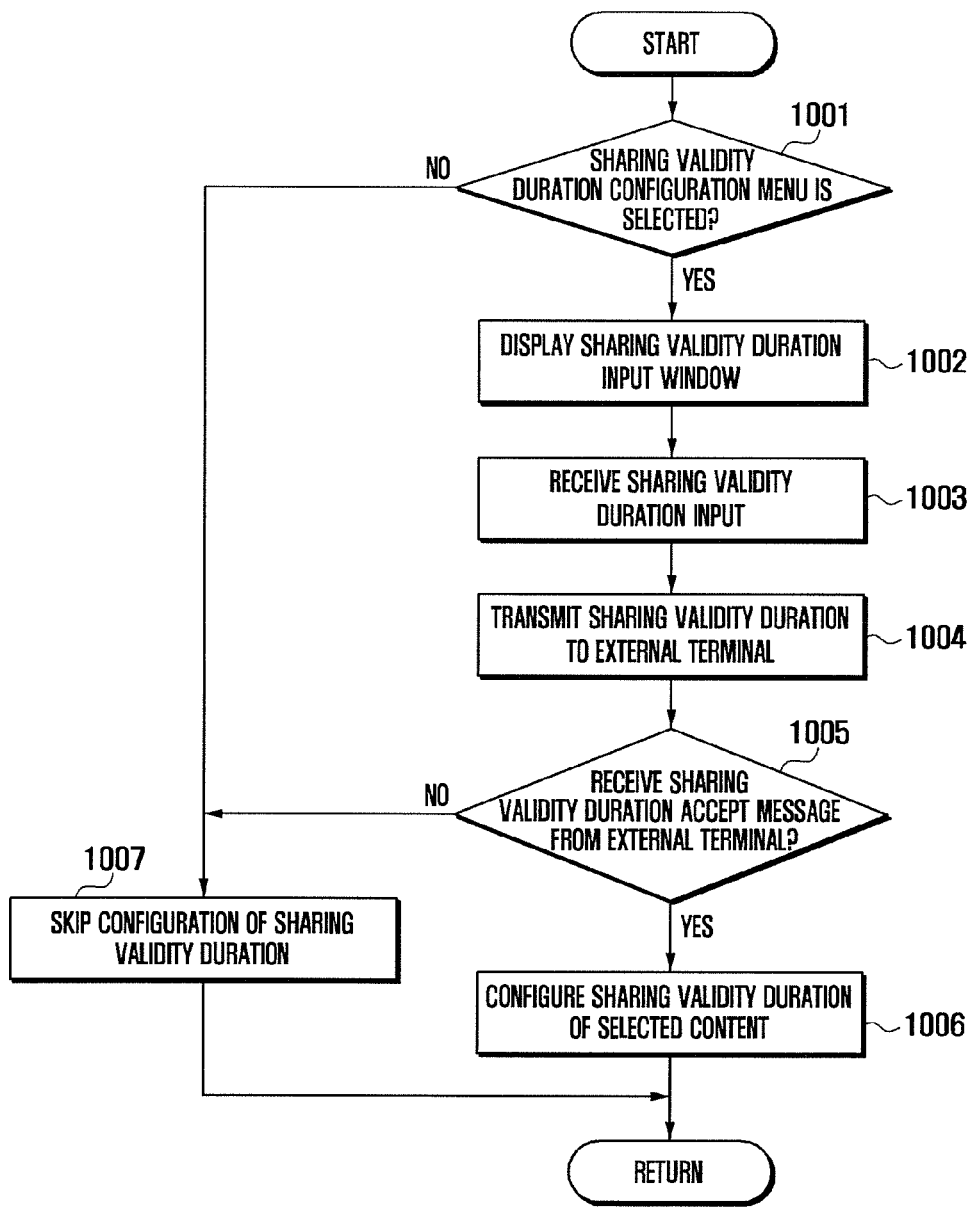
FIG. 10 illustrates greater detail of a sharing validity configuration process of the content management method according to an embodiment of the present invention.

FIG. 10 is a flowchart illustrating a sharing validity configuration process of the content management method according to an embodiment of the present invention.

Referring to FIG. 10, the control unit 170 determines whether the sharing validity duration configuration menu is selected (block 1001). The sharing validity duration configuration menu can be provided as a submenu of the content sharing menu or as an independent menu separated from the content sharing menu.

If the user selects the sharing validity duration configuration menu, the control unit 170 controls the display unit 160 to display a sharing validity duration input window (block 1002). Next, the control unit 170 checks the sharing validity duration input through the sharing validity duration input window (block 1003) and controls the short range communication unit 130 to transmit the sharing validity duration to the external terminals sharing the content (block 1004).

If the sharing validity duration is received, each external terminal can output a message asking for the user to accept or reject so as to transmit a sharing validity duration accept message or a sharing validity duration reject message to the mobile terminal 100 according to whether the user selects the 'accept' or 'reject' button.

The control unit 170 determines whether the sharing validity duration accept message or the sharing validity duration reject message is received by means of the short range communication unit 130 from the external terminal (block 1005) and configures the sharing validity duration as entered by the user when the sharing validity duration accept message is received (block 1006) and skips configuration of the sharing validity duration (block 1007) when no sharing validity duration accept message is received. The sharing validity duration is stored in the sharing validity duration DB within the storage unit 140 along with the content name.

The shared content is segmented into segments and then stored in the segment DB 142, and the control unit 170 determines whether the sharing validity duration of the content has expired so as to delete the corresponding content when the sharing validity duration of the content has expired. The control unit 170 deletes the content of which sharing validity duration has expired from the shared contents list DB 143 and the information on the corresponding content from the sharing validity duration DB. At this time, the control unit 170 controls the audio processing unit 120 and the display unit 160 to indicate an alarm of deletion of the content to be deleted due to the expiry of the sharing validity duration.

As described above, the content management method and apparatus of the present invention is capable of protecting secret content from being illegally exposed by allowing its execution only when the sharers of the content are placed near enough and accept the execution. Also, the content management method and apparatus of the present invention are capable of segmenting a content into a plurality of segments and storing the segments in different terminals in a distributed manner, thereby overcoming the storage limit of the mobile terminal.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A contents management method of a mobile terminal, the method comprising:
   establishing a connection to at least one external terminal;
   segmenting a content stored in the mobile terminal into segments;
   sharing the content by distributing the segments to the terminals;
   integrating, when a content execution command is input, the segments distributed to the terminals into the content;
   storing the integrated content; and
   deleting, when at least one of the terminals is disconnected, the integrated content in the mobile terminal.

2. The contents management method of claim 1, wherein establishing the connection comprises:
   checking an identifier of the at least one external terminal;
   determining whether the identifier exists in a content-sharing terminal database; and
   displaying, when the identifier exists in the content-sharing terminal database, at least one of a content sharing menu and a content execution menu.

3. The contents management method of claim 2, wherein establishing the connection further comprises:
   displaying, when the identifier does not exist in the content-sharing terminal database, a content-sharing terminal database registration menu; and
   registering, when the content-sharing terminal database registration menu is selected, the identifier of the at least one external terminal with the content-sharing terminal database.

4. The contents management method of claim 1, wherein sharing the content comprises:
   selecting the content to be shared with the at least one external terminal in response to a user input;
   segmenting the content into plural segments;
   transmitting at least one segment to the at least one external terminal;
   storing the segments that remain after transmitting the at least one segment in the mobile terminal;
   receiving a segment-saving complete message from the at least one external terminal; and
   registering the selected content with a shared content list database.

5. The contents management method of claim 4, further comprising ciphering the selected content, wherein segmenting comprises dividing the ciphered content into the segments.

6. The contents management method of claim 4, wherein integrating the segments comprises:

selecting a content to be executed in response to a user input;

checking at least one external terminal storing the segments of the selected content;

determining whether the at least one external terminal is connected to the mobile terminal through a short range communication channel;

transmitting, when the external terminal is connected to the mobile terminal, a content integration request message to the at least one external terminal;

receiving the segments from the at least one external terminal;

recovering content by integrating the received segments and the segments stored in the mobile terminal;

transmitting the recovered content to the at least one external terminal; and executing the recovered content.

7. The content management method of claim 4, wherein integrating the segments comprises:

selecting a content to be executed in response to user input;

checking at least one external terminal storing the segments of the selected content;

determining whether the at least one external terminal is connected to the mobile terminal through a short range communication channel;

transmitting, when the external terminal is connected to the mobile terminal, a content integration request message to the at least one external terminal;

receiving a content integration accept message from the at least one external terminal;

transmitting the segments stored in the mobile terminal to the at least one external terminal;

receiving the segments stored in transmitted by the at least one external terminal;

recovering the content by integrating the received segments and the segments stored in the mobile terminal; and executing the content.

8. The contents management method of claim 4, wherein sharing comprises configuring a sharing validity duration of the content.

9. The contents management method of claim 8, wherein configuring comprises:

presenting, when a sharing validation configuration menu is selected, a sharing validity duration input window;

transmitting, when a sharing validation duration is input, the sharing validation duration to the at least one external terminal; and determining, when a sharing validity duration accept message is received from the at least one external terminal, the sharing validity duration of the content.

10. The contents management method of claim 8, further comprising:

determining whether the sharing validity duration has expired; and deleting, when the sharing validity duration has expired, the segments of the content of which sharing validity duration has expired from a segments database.

11. The contents management method of claim 10, further comprising deleting the content of which sharing validity duration has expired from the shared content list database.

12. The contents management method of claim 1, wherein the connection can be established according to one of a Near Field Communication (NFC), a Bluetooth, an Infrared network, a Zigbee, and a Radio Frequency Identification (RFID).

13. A mobile terminal comprising:

a segmentation module configured to segment a content into a plurality of segments;

a segments database configured to store some of the segments;

a short range communication module configured to establish a connection with at least one external terminal and transmit the segments that remain after storing in the segments database to the at least one external terminal;

an integration module configured to integrate, when a content execution command is input, the segments stored in the at least one external terminal and the mobile terminal into the content;

a integrated content database configured to store the integrated content; and a deletion module configured to delete the integrated content from the mobile terminal when the connection is released.

14. The mobile terminal of claim 13, further comprising an input unit configured to receive an input for selecting the external terminal and the content to be shared with the external terminal, a sharing command for sharing the selected content with the external terminal, and an execution command for executing the shared content.

15. The mobile terminal of claim 13, further comprising an execution module configured to execute the integrated content.

16. The mobile terminal of claim 14, further comprising a content-sharing terminal database configured to store a list of the external terminals sharing the content selected by means of the input unit.

17. The mobile terminal of claim 13, further comprising:

a sharing validity management unit configured to configure a sharing validity duration of the content to be segmented; and a sharing validity duration database configured to store the sharing validity duration of the content.

18. The mobile terminal of claim 13, wherein the short range communication module is further configured to:

check an identifier of the at least one external terminal; and determine whether the identifier exists in a content-sharing terminal database;

wherein, when the identifier exists in the content-sharing terminal database, a display displays at least one of a content sharing menu and a content execution menu.

19. The mobile terminal of claim 18, wherein:

the display displays a content-sharing terminal database registration menu when the identifier does not exist in the content-sharing terminal database, and when the content-sharing terminal database registration menu is selected, the mobile terminal registers the identifier of the at least one external terminal with the content-sharing terminal database.

20. The mobile terminal of claim 13, wherein the connection can be established according to one of a Near Field Communication (NFC), a Bluetooth, an Infrared network, a Zigbee, and a Radio Frequency Identification (RFID).

* * * * *